United States Patent [19]

Stadler et al.

[11] Patent Number: 5,175,653
[45] Date of Patent: Dec. 29, 1992

[54] UTILIZATION OF A MATERIAL POSSESSING A MICRO-DUPLEX GRAIN STRUCTURE

[75] Inventors: Hansjorg Stadler, Ruckersdorf; Peter Ruchel, Lauf, both of Fed. Rep. of Germany

[73] Assignee: Diehl GmbH & Co., Nuremberg, Fed. Rep. of Germany

[21] Appl. No.: 157,330

[22] Filed: Feb. 17, 1988

[30] Foreign Application Priority Data

Mar. 28, 1987 [DE] Fed. Rep. of Germany ....... 3710334

[51] Int. Cl.⁵ .......................... G02B 1/00; C22C 9/04
[52] U.S. Cl. .................... 359/838; 148/433; 148/434
[58] Field of Search ........... 148/432, 433, 434; 420/477, 478, 479, 481, 482; 250/327.2 R, 484.1 R; 350/1.7; 359/838

[56] References Cited

U.S. PATENT DOCUMENTS

| | | | |
|---|---|---|---|
| 4,226,621 | 10/1980 | Ruchel | 148/433 |
| 4,238,249 | 12/1980 | Ruchel | 148/11.5 C |
| 4,288,257 | 9/1981 | Ruchel | 148/11.5 C |

Primary Examiner—George Wyszomerski
Attorney, Agent, or Firm—Scully, Scott, Murphy & Presser

[57] ABSTRACT

Deflection of laser beams, irrespective as to whether this is implemented within or externally of the laser itself; necessitating the utilization of metal mirrors or reflectors of high-quality which, in short, are designated as laser mirrors or reflectors. Laser mirrors of that type require an extremely good mirror surface, a high reflective capability and a good geometric planicity, as well as a high surface hardness. Brass possessing an inherently known microduplex matrix or grain structure provides a significant improvement in the properties of laser mirrors. A material of that type has, by nature, a microcrystalline structure, possesses a freedom from stresses, a high degree of stiffness, and a good material hardness.

4 Claims, No Drawings

UTILIZATION OF A MATERIAL POSSESSING A MICRO-DUPLEX GRAIN STRUCTURE

BACKGROUND OF THE INVENTION

1. Field of the Invention

The present invention relates to the deflection of laser beams, irrespective as to whether this is implemented within or externally of the laser itself; necessitating the utilization of metal mirrors or reflectors of high-quality which, in short, are hereinbelow designated as laser mirrors or reflectors. Laser mirrors of that type require an extremely good mirror surface, a high reflective capability and a good geometric planicity, as well as a high surface hardness.

2. Discussion of the Prior Art

Metal mirrors or reflectors which are in current use are preferably produced from polycrystalline brass or copper, and through the intermediary of a suitable surface treatment; for instance, such as diamond polishing, are imparted the necessary optical properties. During the treatment of such types of metal mirrors, there is encountered the always closer approach to a natural limitation in the quality of the surface, which is dependent upon the type of material. At a depth in the roughness (peak-to-valley) of the surface, it does not appear to be possible to be able to attain roughness values (surface finish) of below 3 nm (nanometers); through step-wise or gradual formation of the surface on the basis of machining, it is currently not possible to extend below 40 nm in the waviness of the surface. Through these two features, namely, the depth in the surface roughness and the step-wise or gradual formation, there is to a decisive degree determined the optical quality of the mirror surface, and as a result thereof the scattering or divergence of the laser beam. The above-mentioned gradual or step-wise formation is produced through the machining treatment of the surface of a polycrystalline material in that the grains along the surface evade or give way to the machining worktool at different measures, and subsequent to treatment again return into their initial position. In accordance with the material composition and crystal structure there are obtained areas; only visible under a microscope, which are offset stepwise relative to each other along the grain boundaries.

Any overcoming of the above-mentioned limitations, pursuant to the current state-of-the-technology regarding such processing machines, appears only to be possible through the employment of new materials for the mirrors.

SUMMARY OF THE INVENTION

It has now been ascertained, that brass possessing an inherently known microduplex matrix or grain structure provides a significant improvement in the properties of laser mirrors. A material of that type has, by nature, a microcrystalline structure, possesses considerable freedom from stresses, a high degree of stiffness, and a good material hardness. With the employment of the same machining or processing technology as for ordinary kinds of brasses, there is obtained an improvement in the surface quality by a factor of 5 to 10, whereby the depth of the roughness is better by a factor of 2 to 3 and the waviness by a factor of up to 10 times in comparison with the usual brasses. The planicity of a laser mirror or reflector which is constituted from a microduplex material is the same as that of ordinary brass, the reflective capability of the material per se is better than for the usual mirrors constituted from the same material. However, by nature, the reflectivity factor of brasses is significantly lower than that of copper. Microduplex brass is substantially harder than copper and considerably less expensive than corresponding monocrystalline materials with comparable structure properties. Because of the microcrystalline formation of the matrix or grain structure, the forming of steps on the surface of a mirror is significantly less than for the usual brass materials, and the scattering of the laser beam is thereby also similarly lower. This is the more important, the shorter-waved the radiation of the laser beam which is to be deflected. With respect to the only average reflective capability which is occasioned by the material in a first instance, there are employed mirrors produced from microduplex brass for lasers possessing a lower power output. However, due to the extremely good rigidity in shape of the material, there can be produced mirrors or reflectors of larger diameters, which through the implementation of suitable measures possess a high degree of planicity, and also maintain the latter upon firing of the laser. Inasmuch as the microduplex material is obtained during manufacture in relatively thin thicknesses, for the manufacture of the mirror there is recommended the application of the material onto a carrier or substrate having a stable confirmation and which possesses a good heat conductivity.

DETAILED DESCRIPTION

Microduplex brass is already known; in particular, having reference to the disclosures of German Patents 27 42 008 and 27 58 882, both commonly assigned to the assignee of this application. Described in those publications are two potential manufacturing processes for a brass with a microduplex matrix or grain structure, which can be utilized in the present case. The brass material pursuant to the invention should possess a theoretical copper content of 61 to 65% copper, with the remainder being zinc. In conformance with the teachings of Guillet relative to the theoretical copper content, as discussed in German Patent 27 58 882, copper or zinc can, in part, be replaced by up to 5% of one or more of the elements selected from the group consisting of nickel, aluminum, manganese, silicon, cobalt or tin. However, the brass material is preferably constituted of about 62% copper and 38% zinc. The hardness of this binary alloy was measured as being HV 150, the strength was determined to be at least 500 N/mm². For multiple material systems, the above-mentioned values can be increased.

The practical investigation of the material has evidenced that, for the same surface treatment process as for ordinary brasses, there can be produced laser mirrors possessing substantially improved qualities than heretofore.

What is claimed is:

1. Apparatus for reflecting laser beams with little or no scattering or divergence which comprises a reflector having a reflective surface formed from a brass material possessing a micro-duplex matrix or grain structure.

2. Apparatus as claimed in clam 1 wherein said reflector is formed from a micro-duplex matrix or grain structure comprising a brass material having a theoretical copper content of about 61–65%, the remainder being zinc.

3. Apparatus as claimed in claim 2 wherein said copper and zinc are replaced in part by up to about 5% of one or more elements selected from the group consisting of nickel, aluminum, manganese, silicon, cobalt, or tin.

4. Apparatus as claimed in claim 2 wherein said brass micro-duplex matrix or grain structure comprises a theoretical copper content of about 62%, and the content of zinc is about 38%.

* * * * *

UNITED STATES PATENT AND TRADEMARK OFFICE
CERTIFICATE OF CORRECTION

PATENT NO. : 5,175,653
DATED      : December 29, 1992
INVENTOR(S): Hansjorg Stadler, et al.

It is certified that error appears in the above-identified patent and that said Letters Patent is hereby corrected as shown below:

Column 2, line 62, Claim 2: "clam 1" should read as --claim 1--

Signed and Sealed this

Second Day of November, 1993

Attest:

BRUCE LEHMAN

*Attesting Officer*    *Commissioner of Patents and Trademarks*